3,788,866
METHOD OF PRODUCING REFRACTORY
MATERIAL
Hakon Flood, Trondheim, and Arne Seltveit, Moholtan, Norway, assignors to Elkem A/S, Oslo, Norway
No Drawing. Continuation-in-part of abandoned application Ser. No. 246,466, Apr. 21, 1972. This application Oct. 2, 1972, Ser. No. 294,275
Claims priority, application Norway, Apr. 26, 1971, 1,540/71
Int. Cl. C04b 35/14
U.S. Cl. 106—69                 9 Claims

ABSTRACT OF THE DISCLOSURE

A method of producing silica refractory materials is disclosed. Finely divided silica is admixed with water and then lime is added to the mixture. Thereafter a proper ammonium compound is added to precipitate calcium as a compound insoluble in water after which the product is baked preferably first at a low temperature for a relatively long period of time and then at a high temperature for a shorter period of time.

---

The present application is a continuation-in-part of our prior copending United States patent application Ser. No. 246,466, filed Apr. 21, 1972, now abandoned.

The present invention is a process for the production of silica refractory bricks with a predominantly tridymite structure. The process is especially useful in that silicon dioxide dust precipitated from the waste gasses from smelting furnaces producing metallic silicon or silicon-containing alloys can be employed. This use of the silicon dioxide dusts promotes the recovery of silicon dioxide from waste gasses and thereby cuts down on environmental pollution.

There have been previous proposals to utilize silicon dioxide dust recovered from smelting furnaces to make refractory bricks. The process involves burning the brick in a temperature range from 800–1300° C. However, with this process primarily cristobalite is formed. Cristobalite, however, has many properties which detract from its use as a refractory. For example, cristobalite when going through a temperature of 270° C. experiences an increase in volume as a result of which the material is easily cracked especially when repeated heating and cooling through this temperature occurs. Tridymite on the other hand while subject to volume changes at 117° C. and 163° C. undergoes such small volume changes that the cracking problems are not detrimental or serious. It is therefore highly desirable to form a tridymite material. Conventional silica bricks are made from quartzite or chalcedony using lime or slaked lime to catalyze the inversion to tridymite through cristobalite. The lime both promotes the inversion and acts as a calcium silicate bonding agent between the tridymite grains. However, the inversion is slow, especially where porous material is produced, and large amounts of cristobalite will still be present in the finished brick. The cristobalite has the tendency even in relatively minor quantities to cause cracking of the finished refractory brick.

In accordance with the present invention it has been found that refractory bricks in which substantially all of the silica is in the tridymite form can be prepared from finely divided silicas, especially silica dust recovered from waste gasses of furnaces producing silicon metal and silicon alloys. This dust which is of colloidal nature, is very finely divided and has a surface area of 15–20 square meters for each gram. The dust is moistened with water and then lime is added thereto. The lime may be present in an amount of from about 1 to about 5% by weight of the mixture and may be in the form of unslaked lime, slaked lime, lime milk etc. of which the preferred is slaked lime. In addition to the catalytic effect for tridymite formation, the addition of lime also establishes a slightly basic condition (pH values 8–9) which is highly beneficial for obtaining a proper plasticity of the mixture. When the blend has been thoroughly admixed, a pulverulent ammonium salt is added to the mixture in an amount approximately equal to or greater than the amount of lime that was added. The ammonium salt must be one which is capable of precipitating calcium as a substantially insoluble salt. Suitable ammonium salts are ammonium carbonate, ammonium bicarbonate, ammonium oxalate, ammonium phosphate, etc. It is very important that the calcium be precipitated as a relatively insoluble compound since calcium (in the form of the hydroxide) remaining in the mixture during the drying will tend to migrate to the exterior of the brick resulting in different sintering effects in the inner and the outer parts of the brick which results in a cracking and deformation of the brick. It is likewise important that the salt used to precipitate the calcium be an ammonium salt since the ammonia and the excess of ammonium compound are easily volatized during the drying and baking (firing) of the brick. In addition, an ammonium compound must be used since the ammonia formed by the reaction with lime will act as a plastifying agent in the same manner as the calcium acts as a plastifying agent before it is precipitated. The conversion of soluble calcium hydroxide to an insoluble calcium precipitate by the addition of an ammonium compound effects only a minor change in the pH of the mixture and the plastic properties of the mixture are therefore practically unchanged.

After the mixture is prepared, it is formed into bricks and then fired. The insoluble calcium precipitate seems to act as a very good catalyst for the cristobalite to tridymite conversion. In accordance with the preferred process of the present invention the brick is fired up to a temperature of 800–900° C., fired at this temperature for a period of time, after which the temperature is raised to 1300–1500° C. and the firing is continued.

Where a porous refractory material is desired, pore forming materials such as sawdust, expanded polystyrene and the like can be added to the refractory mixture.

Generally speaking, the amount of silicon dioxide material should be by weight from about 7 to about 20 parts per 10 parts of water. The amount of pore forming material, if used, will depend on the nature and properties of the material in question and will usually be from about 3 parts to about 8 parts per 10 parts of water where the pore forming material is sawdust or a similar material.

Regarding the firing conditions it is important to note that the total firing cycle of about 50 hours for these bricks is much shorter than the firing cycle for silica bricks made from conventionally raw materials which is in the range of 200–250 hours. This means lower production costs and increased capacity on the kilns.

For such short firing periods it must be stressed that if sawdust or other organic materials are added to the raw material mixture, the temperature rise around 500° C. must be slow. Preferably the bricks should be kept at 500° C. for about 10 hours to ensure complete removal of carbonaceous matter without detrimental temperature increase inside the bricks due to the heat of oxidation and cracking due to fast gas evolution.

Likewise it has been found that the firing curve should not be too steep in the temperature range 800–900° C. and best results can be obtained if the temperature of the bricks can be kept within this range for a period of 4–10 hours. Good results have sometimes been obtained with even faster heating in this range but very often faster heating has resulted in extensive shrinkage of the bricks. The main purpose of relatively slow heating rate at 800–900° C. is to convert amorphous silica to highly disordered cristobalite which can be easily converted to tridymite at higher temperatures.

For firing in large kilns where temperature gradients can hardly be avoided, the following firing curve is recommended:

|  | Hours |
|---|---|
| 0–500° C. | 4 |
| 500° C. | 10 |
| 500–800° C. | 4 |
| 800–900° C. | 10 |
| 900–1400° C. | 5 |
| 1400° C. | 10 |
| 1400–20° C. | 10 |

These and other aspects of the present invention are illustrated in the examples which follow.

EXAMPLE 1

A mixture comprising 1500 grams silica dust, 570 grams sawdust and 1.35 liters of water was admixed for approximately ten minutes in a laboratory scale mixer. The silicon dioxide dust was colloidal silica which has been precipitated from the waste gasses of a metallic silicon furnace. To this admixture was added 40 grams of finely divided calcium hydroxide and admixing was continued for an additional ten minutes. Thereafter, 60 grams of ammonium bicarbonate was added and mixing was again continued for ten minutes.

The resulting mixture was relatively plastic and was formed by hand in a simple iron mold to bricks of approximately 230 x 115 x 65 millimeters. The bricks were dried at ambient temperature for about fifteen hours and then were dried in an oven at about 50° C. for about 48 hours. Thereafter, the bricks were transferred to a laboratory furnace with Kanthal elements. The bricks were baked at about 450° C. for two hours, raised to 500° C. for an additional four hours and then the temperature was raised to 830° C. The bricks were baked between 830° C. and 900° C. for about fifteen hours after which the temperature was raised to 1300–1400° C. at which temperature the bricks were cooked for about ten hours. The furnace was then shut off and the bricks were allowed to cool overnight.

Two of the bricks were analyzed with the following results:

|  | Brick 1 | Brick 2 |
|---|---|---|
| Porosity, percent | 67 | 67 |
| Weight per volume (kg./dm.³) | 0.74 | 0.74 |
| $t_a$, ° C | 1,595 | 1,605 |
| $t_e$, ° C | 1,630 | 1,625 |

$t_a$ and $t_e$ are a measure of the comparison strength of the refractory material. $t_a$ is defined as that temperature limit which corresponds to 0.6% longitudinal shrinkage when the sample is heated under a pressure of 1 kg./cm.² and the temperature is raised according to a standard temperature/time curve. $t_e$ is defined as that temperature which corresponds to 40% longitudinal shrinkage under the same conditions. At $t_e$, the brick is considered to be totally broken down.

EXAMPLE 2

The process of Example 1 was repeated using the following constituents:

1500 grams silicon dioxide dust
380 grams sawdust
2 liters expanded polystyrene
1.15 liters water
40 grams slaked lime
110 grams ammonium bicarbonate The finished bricks had the following properties:

| Porosity | percent | 73 |
|---|---|---|
| Weight per volume (kg./dm.³) |  | 0.61 |
| $t_a$ |  ° C | 1,630 |
| $t_e$ |  ° C | 1,640 |

EXAMPLE 3

Example 2 is repeated except that ammonium oxalate is used instead of ammonium bicarbonate. Comparable results are obtained.

EXAMPLE 4

A brick mixture was prepared in accordance with Example 1 using the following ingredients:

1500 grams silica
570 grams sawdust
1 liter water
40 grams calcium hydroxide
60 grams ammonium carbonate In this case the bricks were formed by pressing. The bricks were brought up to a temperature of 450° C. over a period of two hours, were held at 450° C. for ten to twelve hours, were then raised from 450° C. to 1400° C. over a period of twelve hours and were held at 1400° C. for about nine hours. The bricks were then allowed to cool for about fifteen hours and had the following properties:

| Porosity | percent | 71 |
|---|---|---|
| Weight per volume (kg./dm.³) |  | 0.67 |

EXAMPLE 5

Example 4 is repeated except that calcium oxide is used in place of the calcium hydroxide. Comparable results are obtained.

It will be understood that the claims are intended to cover all changes and modifications of the preferred embodiments of the invention, herein chosen for the purpose of illustration, which do not constitute departures from the spirit and scope of the invention.

What is claimed is:

1. A process for the preparation of silica refractory materials comprising:
   (a) admixing 10 parts water and from about 7 parts to about 20 parts by weight of the water of a finely divided material consisting essentially of silicon dioxide;
   (b) adding lime in an amount of from about 1% to about 5% by weight of the mixture of (a);
   (c) thereafter adding an ammonium salt in an amount substantially equal to or greater than the amount of lime, said ammonium salt being capable of forming a substantially insoluble calcium precipitate in said mixture and whereby a substantially insoluble calcium precipitate is formed; and
   (d) firing the mixture.

2. The process of claim 1 wherein the lime is selected from the group consisting of unslaked lime, slaked lime and lime milk.

3. The process of claim 1 wherein the ammonium salt is selected from the group consisting of ammonium carbonate, ammonium bicarbonate, ammonium oxalate and ammonium phosphate.

4. The process of claim 1 wherein the finely divided material is of colloidal nature.

5. The process of claim 1 wherein the finely divided material has a surface area of 10–20 square meters for each gram.

6. The process of claim 1 further including a pore forming material.

7. The process of claim 1 wherein firing is carried out in at least three steps comprising up to 800° C., 800–900° C. and from 1300–1500° C.

8. The process of claim 1 wherein the finely divided material is silica dust precipitated from the waste gasses of furnaces producing metallic silicon or silicon-containing alloys.

9. A process for the preparation of silica refractory brick comprising:
 (a) admixing 10 parts water and from about 7 parts to about 20 parts by weight of water of a colloidal silica dust precipitated from the waste gasses of furnaces producing metallic silicon or silicon-containing alloys;
 (b) adding slaked lime in an amount of from about 1% to about 5% by weight of the mixture of (a);
 (c) thereafter adding an ammonium salt selected from the group consisting of ammonium carbonate, ammonium bicarbonate, ammonium oxalate and ammonium phosphate to form a substantially insoluble calcium precipitate;
 (d) forming the mixture to the shape of a brick; and
 (e) firing the formed brick in at least three steps comprising:
  (i) up to 800° C.
  (ii) 800° C.–900° C.
  (iii) 1300° C.–1500° C.

References Cited
UNITED STATES PATENTS

| | | | |
|---|---|---|---|
| 3,144,345 | 8/1964 | McCreight et al. | 106—69 |
| 3,163,688 | 12/1964 | Lindenthal | 106—69 |
| 3,207,612 | 9/1965 | Martin | 106—69 |
| 3,223,541 | 12/1965 | Lindenthal | 106—69 |
| 3,620,783 | 11/1971 | Mahler et al. | 106—69 |

JAMES E. POER, Primary Examiner